United States Patent
Lai et al.

(10) Patent No.: US 6,966,652 B1
(45) Date of Patent: Nov. 22, 2005

(54) METHOD AND APPARATUS FOR COOLING CONTROL

(75) Inventors: Chih-Min Lai, Kaohsiung (TW); Ren-Cheng Chao, Taipei (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/702,759

(22) Filed: Nov. 6, 2003

(30) Foreign Application Priority Data

Nov. 15, 2002 (TW) ................................ 91133486 A

(51) Int. Cl.⁷ .......................... G03B 21/16; G03B 21/18
(52) U.S. Cl. ....................................................... 353/52
(58) Field of Search ............................. 353/52, 54, 57, 353/58, 60, 61

(56) References Cited

U.S. PATENT DOCUMENTS

| | | | |
|---|---|---|---|
| 3,841,746 A * | 10/1974 | Chase et al. ................... | 353/57 |
| 5,171,518 A * | 12/1992 | Barshay et al. ............. | 376/247 |
| 6,588,907 B1 * | 7/2003 | Billington et al. ............ | 353/57 |
| 6,702,444 B2 * | 3/2004 | Takizawa et al. ............. | 353/52 |
| 6,763,711 B1 * | 7/2004 | Nair et al. ................ | 73/204.15 |

* cited by examiner

Primary Examiner—Christopher Mahoney
(74) Attorney, Agent, or Firm—Snell & Wilmer L.L.P.

(57) ABSTRACT

The present invention provides a method and an apparatus for adjusting a cooling period according to a current condition of a system. The system includes an electronic device and a cooling device. The system has a predetermined temperature value Tp and a first temperature value T1. In the present invention, a second temperature value T2 is detected. Then, a temperature difference X is obtained by subtracting the second temperature value T2 from the first temperature value T1. The present invention compares the temperature difference X with the predetermined temperature value Tp. When the temperature difference X is greater than the predetermined temperature value Tp, the present invention stops the cooling operation. Otherwise, the present invention calculates a cooling time period K based on the temperature difference X, and proceeds with cooling for cooling time period K.

17 Claims, 5 Drawing Sheets

METHOD AND APPARATUS FOR COOLING CONTROL

CROSS-REFERENCED TO RELATED APPLICATIONS

This application claims priority of Taiwan Patent Application Serial No. 091133486 entitled "Method and Apparatus for Cooling Control", filed Nov. 15, 2002.

FIELD OF INVENTION

The present invention relates to a cooling control method and apparatus, and more particularly to a cooling control method and apparatus for flexibly adjusting a cooling time period according to a condition of a system.

BACKGROUND OF THE INVENTION

As the types of presentations in a conference become more and more diversified, the projector becomes necessary equipment in almost any conference. Thus, consumers are demanding more about the performance of the projector. Since the LCD projector became available in the market, manufacturers have endeavored to improve the brightness level of the projector, so as to make possible a perfect presentation even in a bright indoor environment. In order to project a clear image in a bright indoor environment without having to turn off the lighting or draw the curtains in the room, the performance of the lamp of the projector needs to be improved. Therefore, the wattage of the lamp used in the projector becomes higher and higher. In this condition, it is necessary to provide a light source module with ideal cooling performance, because if the cooling process is not good enough, the devices inside the projector may be terribly damaged.

As is known to all, during operation the cooling method of the projector is provided in order to keep the temperature inside the projector in a safety range.

After the projector operates for a period of time, the inside of the projector and the light source module is still at an undesired high temperature. Thus, the cooling method during turning off the projector is conventionally configured to cool the projector for a predetermined period of time by a cooling device, such as a fan. The projector is truly turned off after the predetermined period of cooling to make sure the temperature is lowered to a safety range. The predetermined period of cooling is usually decided according to experiments.

The common cooling method of the projector and its disadvantages are discussed in the following divided in three phases, the turning on phase, the operating phase, and the turning off phase.

Generally, if the projector is operated in a correct manner, the cooling device is able to cool down the projector during turning off the projector. However, it always keeps users waiting for a period of time before completely turning off the power. Users waste a lot of time on waiting. Besides, the fan inside the projector is usually set in full-speed rotation in order to shorten the cooling period, and full-speed rotation makes unpleasant noise. Moreover, the ambient temperature can affect the efficiency of the cooling method in lowering the temperature. For example, a higher ambient temperature, i.e. a bad condition for cooling, may result in insufficient cooling, and even cause a damage to the lamp or other devices inside the projector. On the other hand, a lower ambient temperature, i.e. a good condition for cooling, may result in waste of users' time on waiting for the cooling method to complete its job.

Furthermore, if the projector abnormally shuts down, due to such as power failure or wrong operation by users, a large amount of residual heat will remain inside the projector. Thus, when the projector is immediately rebooted, the conventional design is to first perform the cooling for a period of time to remove the residual heat before the users can operate the projector. However, if the time interval between the abnormal shut down and rebooting is long enough for completely cooling the projector, the predetermined cooling period is in fact not necessary and causes a waste of time. Moreover, the abnormal shut down can make the projector unable to remove the heat inside if the projector has operated for a long time. Even the predetermined cooling time period may not be long enough and so the projector may not be rebooted successfully or function properly.

As described above, the conventional cooling control method is unable to cope with various conditions during operation, and results not only in inconvenience of operation but also damage of the projector. Therefore, it is required to provide a cooling control method and apparatus for flexibly adjusting the cooling time period according to various operation conditions.

SUMMARY OF THE INVENTION

The present invention provides a method and apparatus for controlling a cooling process of a system. The system includes an electronic device and a cooling device. The system has a first power source and a second power source respectively providing the electronic device and the cooling device with required power during operation. The system has a predetermined temperature value Tp.

The cooling control method includes the steps of detecting and storing a first temperature value T1 while cooling the system. The first temperature value T1 is a temperature of the electronic device detected at a most recent time the first power source is turned off. Then, a second temperature value T2 is detected and stored; the second temperature value T2 is the currently detected temperature of the electronic device. A temperature difference X is calculated by subtracting the second temperature value T2 from the first temperature value T1. When the temperature difference X is larger than the predetermined temperature value Tp, the cooling device stops cooling the system. When the temperature difference X isn't larger than the predetermined temperature value Tp, the cooling device keeps cooling the system for a cooling time period K according to the temperature difference X.

DETAILED DESCRIPTION

Figure 1:
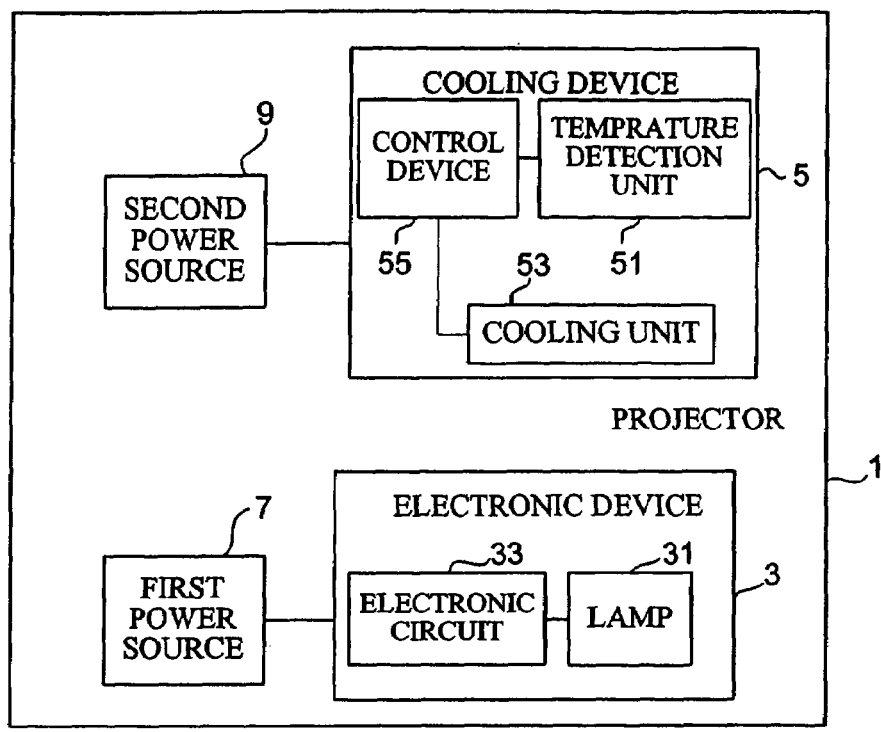
FIG. 1 illustrates a first embodiment of a cooling device of a projector in accordance with the present invention.

FIG. 1 illustrates a first embodiment of a cooling device of a projector in accordance with the present invention. A cooling device 5 is provided to cool an electronic device 3 inside a projector 1. It is noted that the cooling device 5 is not limited to application in a projector but can be applied to any other similar apparatus.

As shown in FIG. 1, the projector 1 includes an electronic device 3 and a cooling device 5. The projector 1 further has a first power source 7 and a second power source 9 respectively providing the electronic device 3 and the cooling device 5 with required power during operation. When the first power source 7 and the second power source 9 are turned on or off, the cooling device 5 determines whether the projector 1 needs to be cooled. Further, the cooling device 5 calculates a cooling time period K when the projector 1 needs to be cooled and keeps cooling the projector 1 for cooling time period K. After cooling for cooling time period K, the temperature of the system falls within a predetermined safe range. Therefore, the projector 1 can be turned on or off without either wasting time or the problem of insufficient cooling.

As shown in FIG. 1, the cooling device 5 includes a temperature detection unit 51, a cooling unit 53, and a control unit 55. The electronic device 3 includes a lamp 31 and an electronic circuit 33. The temperature detection unit 51 detects the temperature inside the system; that is a first temperature value T1 and a second temperature value T2 in this embodiment. The first temperature value T1 is a temperature of the electronic device 3 detected at a most recent time the first power source 7 is turned off. The second temperature value T2 is the currently detected temperature of the electronic device 3. The time during detecting T1 and T2 can be set as a constant time period. It should be noted that the control unit 55 can further include a storage unit for storing a predetermined temperature value Tp, the first temperature value T1, and the second temperature T2 therein, although the storage unit is not shown in FIG. 1 for conciseness. The predetermined temperature value Tp is a maximum temperature difference signifying the sufficiency of cooling. In this embodiment, the temperature detection unit 51 is embodied as a temperature sensor, and the cooling unit 53 is embodied as a fan. The control unit can further include a time counter (not shown).

When the projector 1 is turned off, the first power source 7 is turned off first. At this time a large amount of residual heat produced by the lamp 31 still remains in the electronic device 3. Therefore, the second power source 9 keeps providing the cooling device 5 with power required to cool the system. The temperature detection unit 51 detects the second temperature value T2, the current temperature of the electronic device 3. The control unit 55 calculates a temperature difference X by subtracting the second temperature value T2 from the first temperature value T1. In this embodiment, when the temperature difference X isn't larger than the predetermined temperature value Tp, the control unit 55 calculates a cooling time period K according to the temperature difference X. Thus, the cooling device 53 keeps cooling the system for cooling time period K, and the temperature of electronic device 3 becomes within a safe range after the cooling. After that, the second power source 9 can be turned off. In this embodiment, the cooling time period K is determined by multiplying the temperature difference X and a cooling rate R, so K is set to $(T2-T1)*R$. The cooling rate R is a time period required to lower the system temperature by one degree. When the temperature difference X is larger than the predetermined temperature value Tp, the control device 55 orders the cooling device 53 to stop cooling the electronic device 3 and turns off the second power source 9 immediately.

On the other hand, when the projector 1 is turned on, the second power source 9 is activated first. The second power source 9 keeps providing the cooling device 5 with power required to cool the system. The cooling process during turning on the projector 1 is provided to remove a large amount of residual heat left from last use of the projector 1. The temperature detection unit 51 detects T2, the temperature of the electronic device 3. The control unit 55 calculates a temperature difference X by subtracting the second temperature value T2 from the first temperature value T1. In this embodiment, when the temperature difference X isn't larger than the predetermined temperature value Tp, the control unit 55 calculates a cooling time period K according to the temperature difference X. Thus, the cooling device 53 keeps cooling the system for the cooling time period K, and the temperature of electronic device 3 becomes within a safe range after the cooling. After that, the first power source 7 can be turned on. In this embodiment, the cooling time period K is determined by $(Tp-(T1-T2))*R$. The cooling rate R is a time period required to lower the system temperature by one degree. When the temperature difference X is larger than the predetermined temperature value Tp, the control device 55 orders the cooling device 53 to stop cooling the electronic device 3. Thereafter, the first power source 7 can be turned on immediately to provide power for the projector 1.

It is noted that the above-mentioned expressions of the cooling time period K are only a preferred embodiment in accordance with the present invention, and not a limitation. The control unit 55 can further flexibly adjust the cooling time period K and control the cooling unit 53 in accordance with various conditions of the projector 1. Therefore, the present invention solves the problems of wasting time cooling the already cooled apparatus and insufficient cooling.

Figure 2:
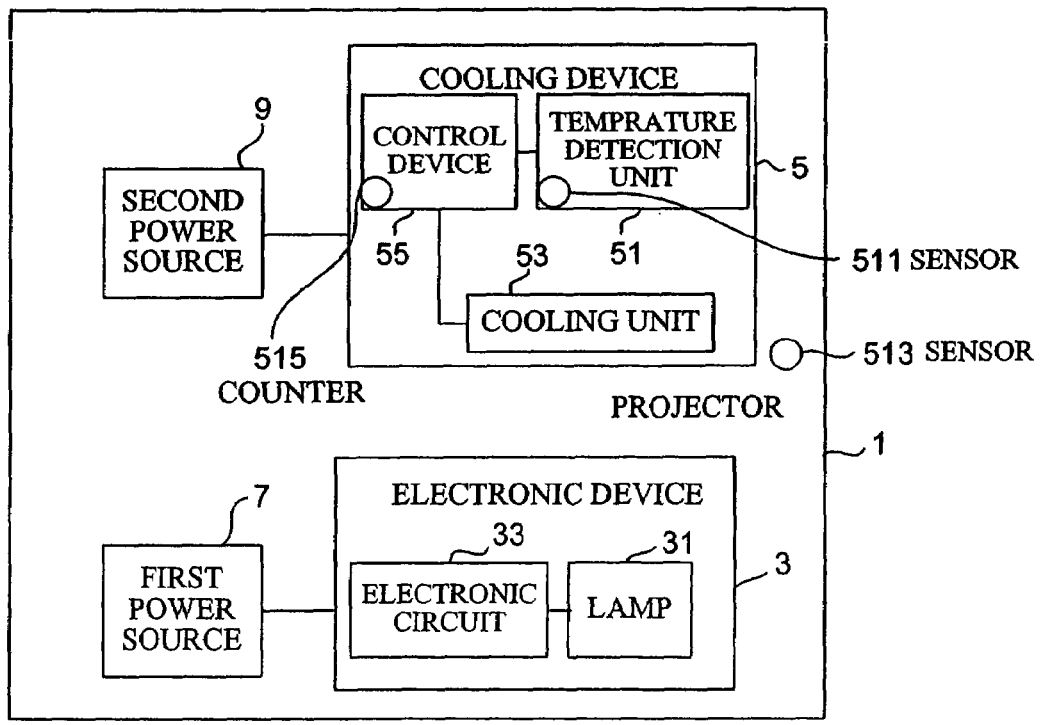
FIG. 2 illustrates a second embodiment of the cooling device of a projector in accordance with the present invention.

FIG. 2 illustrates a second embodiment of the cooling device of a projector in accordance with the present invention. The temperature detection unit 51 in the second embodiment further includes, in comparison with the first embodiment, an internal temperature sensor 511 and an external temperature sensor 513. The internal temperature sensor 511 detects the first temperature value T1 and second temperature value T2, and the external temperature sensor detects a third temperature value T3; the third temperature value T3 represents an ambient temperature around the projector 1.

In this embodiment, the storage unit further stores a tolerance value M. The control unit 55 further calculates a temperature difference Y between the first temperature value T1 and the third temperature value T3, and compares the temperature difference Y with the tolerance value M. When the temperature difference Y is larger than the tolerance value M, the cooling device 53 keeps cooling the electronic device 3 for a predetermined time. The predetermined time depends on the condition of operation and is not limited to a specific value here.

The present invention not only flexibly adjusts the cooling time period according to various operation conditions, but also takes into consideration the impact of the ambient temperature. Therefore, the present invention solves the problems of wasting time cooling the already cooled apparatus and insufficient cooling.

Figure 3A:
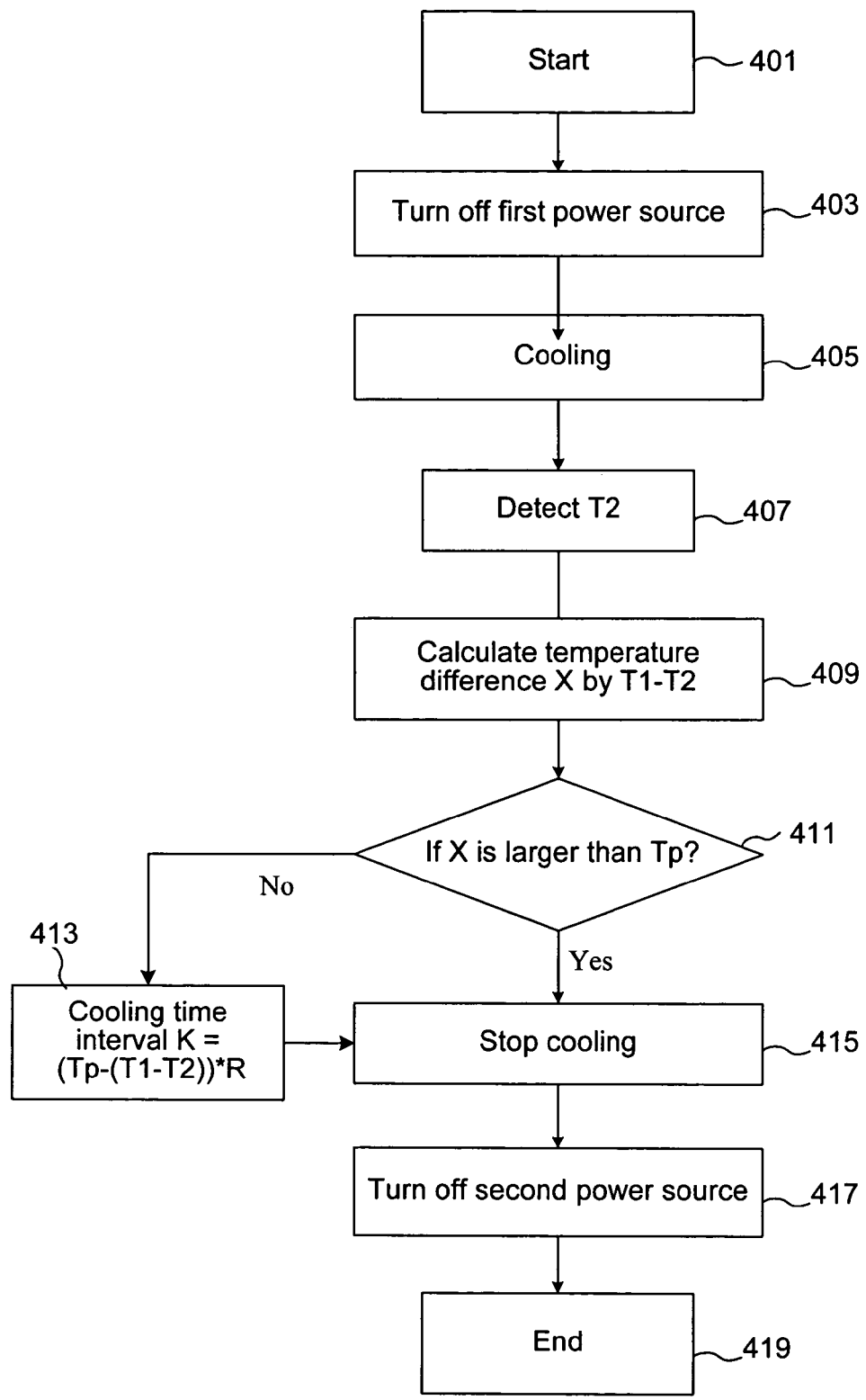
FIGS. 3A and 3B are a flowchart of the cooling control method in accordance with the first embodiment.
Figure 3B:
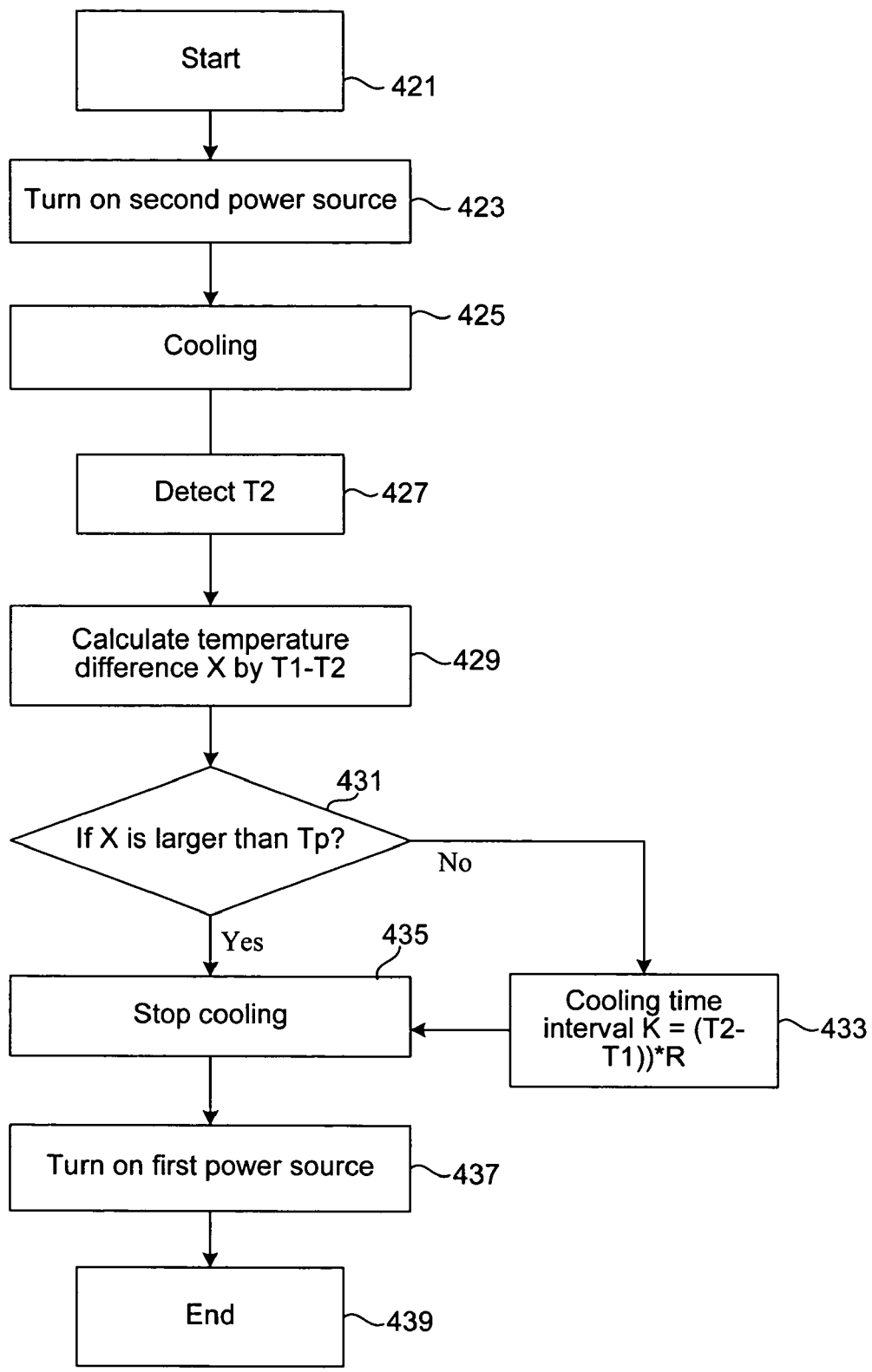

The cooling control method in accordance with the present invention is further elaborated hereinafter. FIG. 3A and FIG. 3B illustrate flowcharts of the cooling control method in accordance with the first embodiment. Specifically, FIG. 3A is a flowchart illustrating a turning-off process of a projector, and FIG. 3B is another flowchart illustrating a turning-on process of the projector. The cooling control method determines whether the projector needs to be cooled during the turning-on process and the turning-off process. The projector includes an electronic device and a cooling device. The projector has a first power source and a second power source respectively providing the electronic device and the cooling device with power required during operation. In this embodiment, the electronic device has a lighting device, such as a lamp. The projector has a predetermined temperature value Tp and a cooling rate R. The cooling rate R is a time period required to lower the system temperature by one degree. It should be noted that the definition of the cooling rate R here is not intended to limit the present invention.

As shown in FIG. 3A, the cooling control method includes steps 401–419 in the turning-off process in accordance with the present invention. The cooling process starts in step 401. When the projector is turned off, the first power source is de-activated first (step 403). The cooling device starts to cool the electronic device (step 405). A second temperature value T2 is detected (step 407). The second temperature value T2 is the current temperature of the electronic device. A temperature difference X is calculated by subtracting the second temperature value T2 from the first temperature value T1 (step 409). T1 is the temperature of the electronic device detected and stored last time the first power source is turned off. The temperature difference X and the predetermined temperature value Tp are compared to determine which is larger (step 411). When the temperature difference X is not larger than the predetermined temperature value Tp, a cooling time period K is calculated and the projector is cooled for the cooling time period K (step 413). The cooling time period K is determined by K=(Tp−(T1−T2))*R. R is a predetermined time period required to lower the system temperature by one degree. When the temperature difference X is larger than the predetermined temperature value Tp, the cooling process of the electronic device is stopped (step 415). The second power source is turned off (step 417). The cooling process ends in step 419.

As shown in FIG. 3B, the cooling control method includes steps 421–439 in the turning-on process in accordance with the present invention. The cooling process starts in step 421. The second power source is turned on (step 423) and the cooling device starts to cool the electronic device (step 425). A second temperature value T2 is detected (step 427). The second temperature value T2 is the current temperature of the electronic device. A temperature difference X is calculated by subtracting the second temperature value T2 from the first temperature value T1 (step 429). T1 is the temperature of the electronic device detected and stored last time the first power source is turned off. The temperature difference X and the predetermined temperature value Tp are compared to determine which is larger. When the temperature difference X is not larger than the predetermined temperature value Tp, a cooling time period K is calculated and the projector is cooled for the cooling time period K (step 433). The cooling time period K is determined by K=(T2−T1)*R. R is a predetermined time period required to lower the system temperature by one degree. When the temperature difference X is larger than the predetermined temperature value Tp, the cooling process of the electronic device is stopped (step 435). The first power source is then turned on (step 437) and the projector is ready to operate. The cooling process ends in step 439. Therefore, the present invention flexibly adjusts the cooling time period according to various operation conditions. The present invention solves the problems of wasting time cooling the already cooled apparatus and insufficient cooling.

Figure 4A:
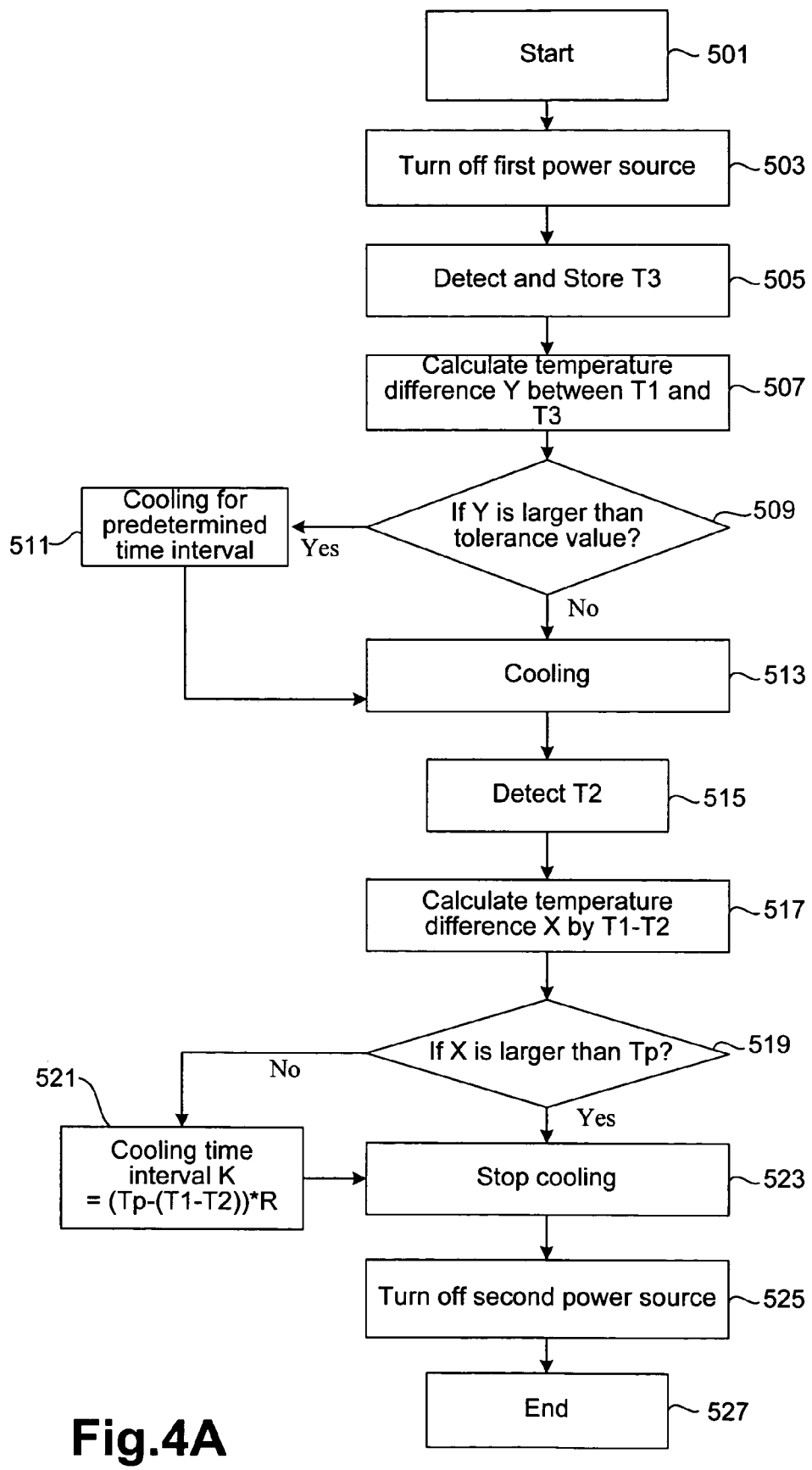
FIGS. 4A and 4B are a flowchart of the cooling control method in accordance with the second embodiment.
Figure 4B:
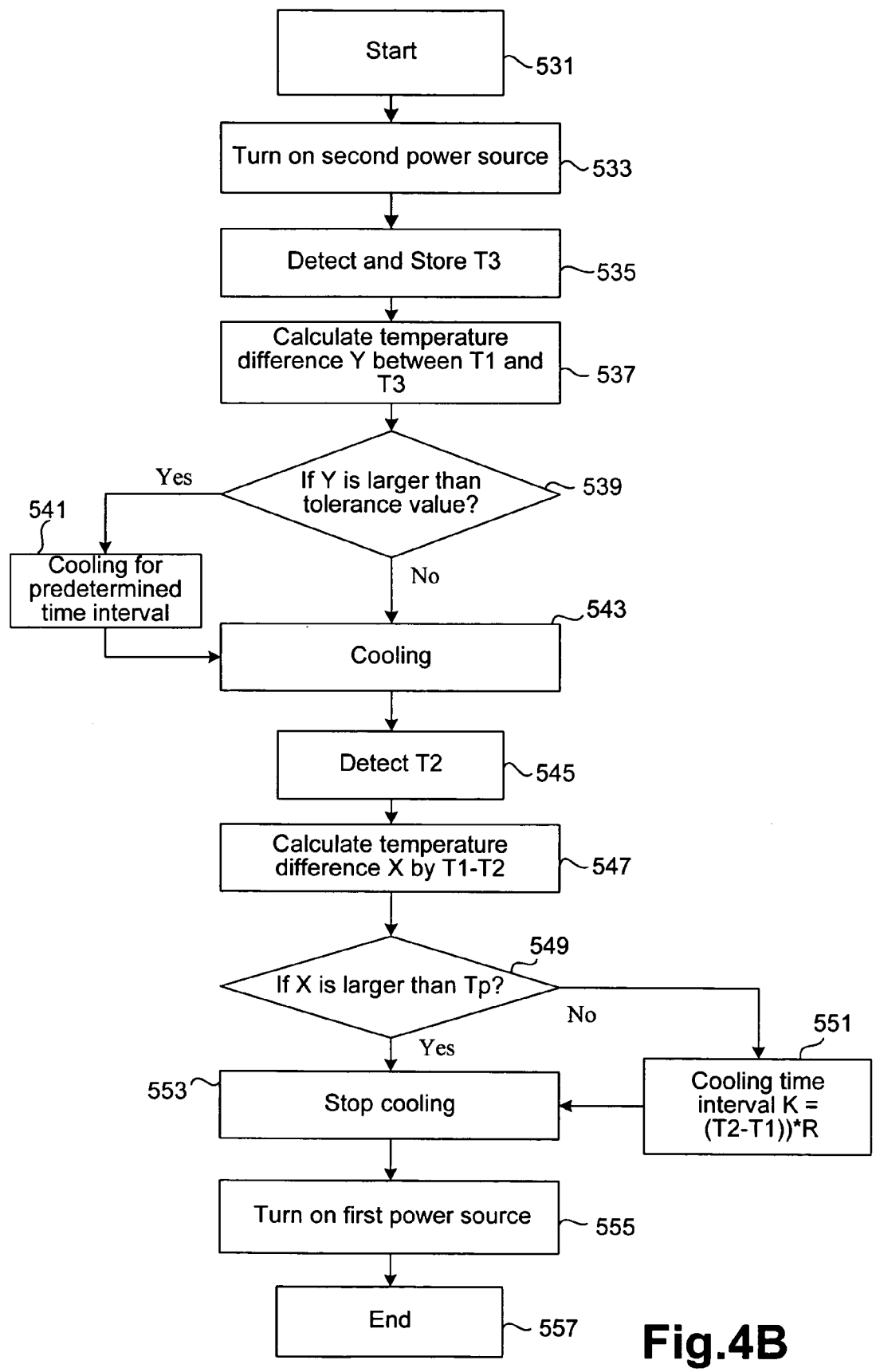

FIG. 4A and FIG. 4B illustrate flowcharts of the cooling control method in accordance with the second embodiment. Specifically, FIG. 4A is a flowchart illustrating a turning-off process of a projector, and FIG. 4B is another flowchart illustrating a turning-on process of the projector. The cooling control method determines whether the projector needs to be cooled during the turning-on process and the turning-off process. In comparison with the cooling control method of the first embodiment, the cooling control method of the second embodiment further includes a predetermined tolerance value M and detects a third temperature value T3. The third temperature value T3 is a current ambient temperature.

As shown in FIG. 4A, the cooling control method includes steps 501–527 in the turning-off process in accordance with the present invention. The cooling process starts in step 501. When the projector is turned off, the first power source is de-activated first (step 503). A third temperature value T3 is detected (step 505), representing an ambient temperature around the projector. A temperature difference Y between the first temperature value T1 and the third temperature value T3 is calculated (step 507). T1 is the temperature of the electronic device detected and stored last time the first power source is turned off. The temperature difference Y and the predetermined tolerance value M are compared to determine which is larger (step 509). When the temperature difference Y is larger than the predetermined tolerance value M, the cooling device keeps cooling the electronic device for a predetermined time (step 511). The predetermined time depends on the condition of operation and is not limited to a specific value here. When the temperature difference Y is not larger than the predetermined tolerance value M, the step 513 is executed. Steps 513 to 527 are the same as steps 405 to 419 (as shown in the first embodiment), and are not elaborated here for conciseness.

As shown in FIG. 4B, the cooling control method includes steps 531–557 in the turning-on process in accordance with the present invention. The cooling process starts in step 531. When the projector is turned on, the second power source is activated first (step 533). A third temperature value T3 is detected (step 535), representing an ambient temperature around the projector. A temperature difference Y between the first temperature value T1 and the third temperature value T3 is calculated (step 537). T1 is the temperature of the electronic device detected and stored last time the first power source is turned off. The temperature difference Y and the predetermined tolerance value M are compared to determine which is larger (step 539). When the temperature difference Y is larger than the predetermined tolerance value M, the cooling device keeps cooling the electronic device for a predetermined time (step 541). The predetermined time depends on the condition of operation and is not limited to a specific value here. When the temperature difference Y is not larger than the predetermined tolerance value M, the step 543 is executed. Steps 543 to 557 are the same as steps 425 to 439 (as shown in the first embodiment), and are not elaborated here for conciseness.

Therefore, the present invention not only flexibly adjusts the cooling time period according to various operation conditions, but also takes into consideration the impact of the ambient temperature. The present invention solves the problems of wasting time cooling the already cooled apparatus and insufficient cooling.

The above description sets forth various preferred embodiments of the invention only, and is not intended to limit the scope, applicability, or configuration of the invention in any way. Rather, various changes may be made in the function and arrangement of the elements described in these embodiments without departing from the spirit and scope of the invention. Thus, the protected scope of the present invention is as set forth in the appended claims.

We claim:

1. A cooling control method for controlling a cooling process of a system, wherein the system includes an electronic device and a cooling device, the electronic device having a time counter, the system has a first power source and a second power source respectively providing the electronic device and the cooling device with required power during operation, the system has a predetermined temperature value Tp, the cooling control method comprising:
    (A) detecting and storing a first temperature value T1, wherein the first temperature value T1 is a detected temperature of the electronic device at a time the first power source was turned off most recently;
    (B) detecting and storing a second temperature value T2, wherein the second temperature value T2 is currently detected temperature of the electronic device;
    (C) calculating a temperature difference X between the first temperature value T1 and the second temperature value T2; and
    (D) determining a cooling time period K from the temperature difference X and the predetermined temperature value Tp, and continuously cooling the system for the cooling time period K.

2. The method of claim 1, wherein the system further includes a cooling rate R, the cooling rate R is a required time interval to lower the system temperature by one degree, the cooling time period K is determined by $K=(Tp-(T1-T2))*R$.

3. The method of claim 2, between the step (A) and the step (B) further comprising:
    turning off the first power source.

4. The method of claim 2, after the step (D) further comprising:
    turning off the second power source.

5. The method of claim 1, wherein the system further includes a cooling rate R and the cooling rate R is a required time interval to lower the system temperature by one degree, the cooling control method further comprising:
    setting the cooling time period K using $K=(T2-T1)*R$.

6. The method of claim 5, between the step (A) and the step (B) further comprising:
    turning on the second power source.

7. The method of claim 5, after the step (D) further comprising:
    turning on the first power source.

8. The method of claim 1, wherein the cooling time period K is set to zero when the temperature difference X is larger than the predetermined temperature value Tp.

9. The method of claim 1, wherein the system further includes a tolerance value M, between the step (A) and the step (B) further comprising:
    detecting a third temperature value T3;
    calculating a temperature difference Y between the first temperature value T1 and the third temperature value T3;
    determining whether the temperature difference Y is larger than the tolerance value M; and
    cooling the system for a predetermined time interval when the temperature difference Y is larger than the tolerance value M.

10. An apparatus for controlling a cooling process of a system, wherein the system includes a electronic device, and the system has a first power source and a second power source respectively providing the electronic device and the apparatus required power during operating, comprising:
    a temperature detection unit for detecting a first temperature value T1 and a second temperature value T2, the first temperature value T1 being a detected temperature of the electronic device at a time the system most recently turned off the first power source;
    a cooling unit; and
    a control unit for storing the first temperature value T1 and the second temperature value T2, the control unit connecting the temperature detecting unit and the cooling unit;
    wherein the control unit calculates a temperature difference X by subtracting the second temperature value T2 from the first temperature value T1, and the control unit has a time counter to determine a cooling time period of the cooling unit from the temperature difference X.

11. The apparatus of claim 10, wherein the system further includes a cooling rate R and the cooling rate R is a required time interval to lower the system temperature by one degree, the control unit further comprising:
    a time counter calculating a cooling time period K to control the cooling unit to continuously cool the system for the cooling time period K; and
    wherein the cooling time period K is determined by $K=(Tp-(T1-T2))*R$ and the Tp is a predetermined temperature value.

12. The apparatus of claim 11, the second temperature value T2 is detected when the system is initiated and the second power source is turned on.

13. The apparatus of claim 10, wherein the system further includes a cooling rate R and the cooling rate R is a required time interval to lower the system temperature for one degree, the control unit further comprising:
    a time counter calculating a cooling time period K to control the cooling unit to continuously cool the system for the cooling time period K; and
    wherein the cooling time period K is determined by $K=(T2-T1)*R$.

14. The apparatus of claim 13, the second temperature value T2 is the current detected temperature.

15. The apparatus of claim 10, wherein the temperature detecting unit comprises a temperature sensor.

16. The apparatus of claim 10, wherein the temperature detection unit comprises:
    an internal temperature sensor for detecting the first temperature value T1 and the second temperature value T2; and
    an external temperature sensor for detecting a third temperature value T3;
    wherein the third temperature value T3 is an environmental temperature.

17. The apparatus of claim 16, wherein the control unit further calculates a temperature difference Y between the first temperature value T1 and the third temperature value T3, and calculates a corresponding time interval from the temperature difference Y, and wherein the control unit controls the cooling unit to cool the system for the corresponding time interval.

* * * * *